United States Patent
Lynde

[15] 3,662,471
[45] May 16, 1972

[54] MEASURING TAPE AND CHALK LINE HOLDING TOOL

[72] Inventor: Michael W. Lynde, 13830 N.W. 5th Avenue, North Miami, Fla. 33168

[22] Filed: Mar. 17, 1970

[21] Appl. No.: 20,344

[52] U.S. Cl. ..................................................33/137, 33/86
[51] Int. Cl. .................................................G01b 3/10
[58] Field of Search ........................33/137, 138, 86, 87

[56] References Cited

UNITED STATES PATENTS

| | | | |
|---|---|---|---|
| 3,145,477 | 8/1964 | Morrison | 33/137 |
| 3,122,836 | 3/1964 | Aciego | 33/86 |
| 2,788,584 | 4/1957 | Adrien | 33/86 X |
| 862,139 | 8/1907 | Darrow | 33/138 |

Primary Examiner—William D. Martin, Jr.
Attorney—Ernest H. Schmidt

[57] ABSTRACT

A rectangular block weight such as a heavy metal is provided with hooks at each end for selectively attaching one end of a measuring tape or chalk line. The underside of the block weight has a friction-grip surface to minimize slippage. The over all length of the block weight tool is such that accurate measurement can be made from a vertical surface and along a horizontal surface by abutting one end of the tool against the vertical surface and adding a whole number of inches to the measurement taken, said whole number being representative of the measured distance occupied by the device.

3 Claims, 9 Drawing Figures

PATENTED MAY 16 1972 3,662,471

INVENTOR.
MICHAEL W. LYNDE
BY Ernest H. Schmidt
ATTORNEY.

MEASURING TAPE AND CHALK LINE HOLDING TOOL

This invention relates to carpentry and related construction trades tools, and is directed particularly to a tool for holding one end of a measuring tape, chalk line or the like enabling a workman working alone simply and accurately to make use of long measuring tapes, chalk lines and the like used in lay-out work.

In building construction and repair work it is often required to take accurate measurements along flat level surfaces, such as when measuring for lay-out of partitions on concrete or wooden floors, or when installing various kinds of flooring and carpeting. After taking such measurements it is often required to strike accurate chalk lines to provide precise guide lines for the installation of partition plates, intersection lines of modular flooring, in the like. Since such measurement distances, because of their length, cannot ordinarily be spanned by the arms length of a single workman, it is usually necessary for him, when working alone, to employ some makeshift method of temporarily holding one end of the tape or line, such as a nail. Such makeshift expedients not only are inconvenient and often unnecessarily time consuming, but also, particularly when using a holding nail or the like, are apt to be inaccurate.

It is, accordingly, the principal object of this invention to provide a measuring tape and chalk line holding tool which will conveniently hold one end of a measuring tape or chalk line and to which the tape or line can quickly be attached and removed, as required, and which will accurately and firmly hold the line or tape in position while measurement is being taken or a chalk line is being struck by a workman working alone.

A more particular object of the invention is to provide a measuring tape and chalk line holding tool in the form of a compact weight having hook means enabling attachment of a variety of measuring tapes and chalk lines, and which is provided with a friction grip floor engagement surface which, under the substantial weight of the body of the tool, minimizes any possibility of slippage while pulling an attached tape or chalk line during use.

Still another object is to provide a tool of the above nature which, in the case of taking measurement with a tape measure, permits accurate measurement to be taken from vertical wall surfaces and the like against which the holding tool is abuttingly placed simply by adding a whole number of inches to the measurement read at the far end of the tape.

Still another object of the invention is to provide a holding tool of the above nature which, because of its high weight-to-bulk ratio and friction grip characteristic, is particularly well adapted to alternate use as a paper weight, such as for holding in place building plans, sketches or the like used in conjunction with a lay-out procedure as described above.

Another object is to provide a holding tool of the above nature which will be compact, economical in cost and dependable and durable in operation.

Other objects, features, and advantages of the invention will be apparent from the following description when read with reference to the accompanying drawings. In the drawings, wherein like reference numerals denote corresponding parts throughout the several views.

Figure 1:
FIG. 1 illustrates, in side elevation, a prefered form of measuring tape and line holding tool embodying the invention shown in use in taking a measurement from a vertical wall surface with a flexible measuring tape.
Figures 2, 3:
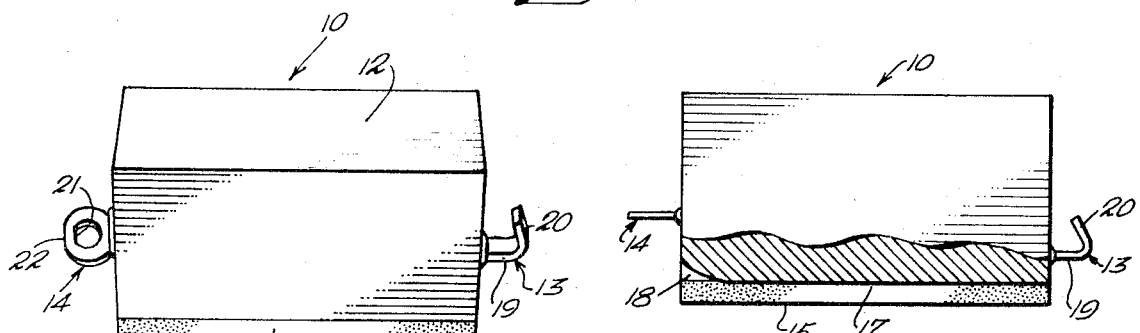
FIG. 2 is an oblique view, as seen from above, of the holding tool, shown separately on an enlarged scale.
FIG. 3 is a side elevational view, partly in vertical section, illustrating constructional details of the tool.
Figure 4:
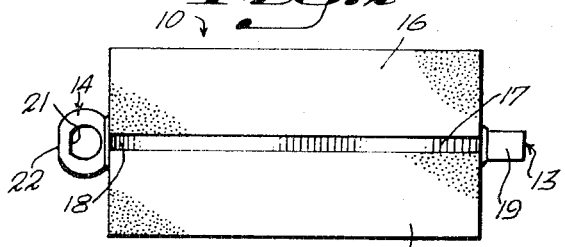
FIG. 4 is a bottom view of the tool.

Referring now in detail to the drawings, reference numeral 10 in FIG. 1 designates, generally, a measuring tape and chalk line holding tool embodying the invention shown in use in holding one end of a flexible measuring tape 11 for measuring along a horizontal surface H from a point of intersection with a vertical wall surface W. As illustrated in FIGS. 2, 3, and 4, the holding tool 10 comprises a rectangular block of a heavy metal, such as of cast iron or cold-rolled steel, which may be substantially square in transverse cross-sectional shape. One end of the rectangular block 12 has welded or otherwise affixed thereto, near the lower end, a hook 13. The other end of the block has similarly secured thereto a substantially annular hook eye 14. To minimize slippage, the underside of the rectangular block 12 has cemented or otherwise affixed thereto a pair of centrally spaced, longitudinally extending friction pads 15 and 16, said friction pads defining therebetween a central, longitudinal slot 17 for the purpose hereinafter appearing. The hook eye end of the slot 17 communicates with an arcuate groove 18 in the undersurface of the block 12 at the hook eye end thereof (see FIG. 3).

The hook 13, which may be of bent metal, comprises an outwardly extending portion 19 terminating in an upwardly and inwardly directed portion 20. The substantially annular hook eye 14, which may be stamped metal, has somewhat flattened inner and outer edges 21 and 22 respectively, at its outermost portion, for the purpose hereinafter appearing.

In use of the holding tool to measure horizontal distances from a vertical intersecting surface, such as a wall as illustrated in FIG. 1, the holding tool will be placed on the floor or other horizontal surface with the flattened outer edge of the hook eye 14 placed in abutting engagement with the wall from which measurements are to be made. The downwardly extending hook 23 at the outermost end of a flexible measuring tape 11 would then be hooked over the upwardly and inwardly directed portion 20 of the holding tool hook 13 (see FIGS. 1 and 6), to enable stretching the measuring tape to its fullest extent for measuring without disturbing the position of the reference or outer hook end of the tape. The friction pads 15 and 16, which will preferably be of sheet foam rubber, impose such a high coefficient of friction as to minimize any possibility of slippage of the holding device or tool, when applied to ordinary concrete or wood working surfaces and under ordinary tensile stresses applied to the tape in taking measurements.

Figure 5:
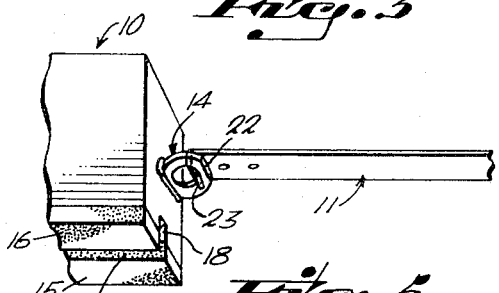
FIG. 5 is a partial oblique view of the tool, as seen from below, showing the attachment thereto of one type of flexible measuring tape.
Figure 6:
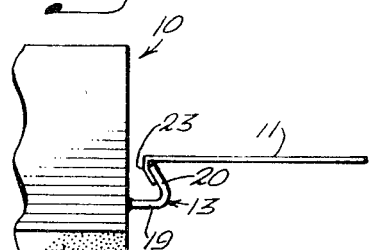
FIG. 6 is a partial side elevational view of the tool showing an alternative method of attaching the measuring tape of FIG. 5.

FIG. 5 illustrates how, as an alternative, the hook end 23 of the flexible measuring tape 11 could be hookingly applied to the hook eye 14 instead of to the hook 13 as illustrated in FIGS. 1 and 6. In this instance, the hook 13 will be placed in abuttment with the vertical surface or wall to be measured from. In each instance, the over all length of the holding device 10 is such, taking into consideration the overlap at the hooking end of the measuring tape with respect to the hook 13 or hook eye 14 to which it is arrached, that it will only be necessary to add a whole number of inches, for example, 5 inches, to the tape measurement reading taken to obtain the true measurement. This whole number of inches to be added, it will be understood, takes into account the measuring distance occupied by the holding tool 10 in its use.

Figure 7:
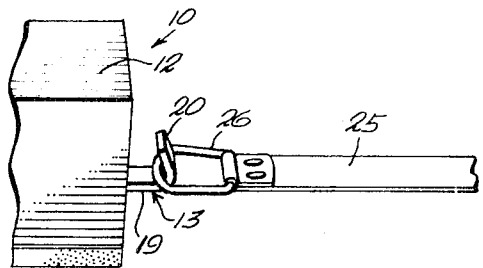
FIG. 7 is a partial oblique view of the tool, as seen from above, illustrating the attachment thereto of another form of flexible measuring tape.

FIG. 7 illustrates how another form of flexible measuring tape 25 having a hook eye 26 at its outer end, such as commonly found on 50 or 100 foot spoole-wound measuring tapes, can readily be hooked over the holding tool hook 13 in use. Here again, the hooking interconnection is such as results in a accurate measurement reading when taken from a vertical wall surface against which the outer end of the holding device is in abutting engagement by adding the whole number of inches occupied by the holding tool.

Figure 8:
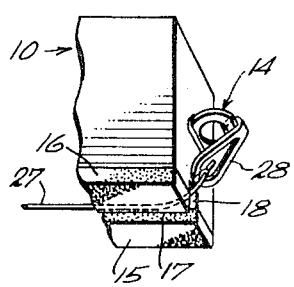
FIG. 8 is a partial oblique view of the tool, as seen from below, illustrating the method of attachment thereto of a chalk line.

FIG. 8 illustrates use of the holding tool 10 in holding the outer end of a chalk line 27. For such use the chalk line is fitted in the longitudinal slot 17 and hooked with its loop hook 28 to the hook eye 14. The arcuate groove 18 at the hook eye end of the slot 17 offers a smooth surface for seating the outer extremity of the chalk line, thereby minimizing any abrading or wearing away of the line in that area.

Figure 9:
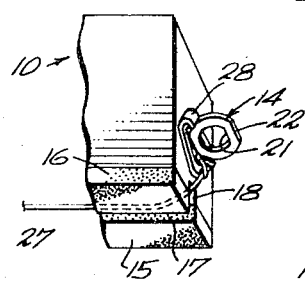
FIG. 9 is a view similar to that of FIG. 8, but illustrating an alternative method of attaching the chalk line.

FIG. 9 illustrates an alternative way in which the chalk line 27 can be attached to the holding tool 10 by passing the loop opening of the loop hook 28 over the hook eye 14.

It is to be noted that the arcuate groove 18 not only smoothly seats the outer end of the chalk line, but also serves to fix it in place against lateral movement so that an accurate chalk line can be struck.

While I have illustrated and described herein only one form in which my invention can conveniently be embodied in practice, it is to be understood that this form is presented by way of example only, and not in a limiting sense. For example, while I have illustrated and described the body member of the tool as being a block of heavy metal, it could as well be in the form of a hollow container having a flat bottom and containing added weight in the form of lead shot or the like. The invention, in brief, comprises all the embodiments and modifications coming within the scope and spirit of the following claims.

What I claim as new and desire to secure by Letters Patent is:

1. A measuring tape and chalk line holding tool comprising, in combination, a body member in the form of an elongated block of metal having a flat undersurface, means for hookingly interengaging one end of a measuring tape to one end of said body member, means for hookingly interengaging one end of a chalk line to the other end of said body member, a pair of laterally spaced, longitudinally extending flat pads of sponge rubber affixed against the under-side of said body member, the spacing between said pads defining a longitudinal groove for guidingly containing an outer end portion of a chalk line hookingly interengaged with said chalk line interengaging means, the outer surfaces of said pads having a high coefficient of friction for friction grip against a floor surface upon which said body member is placed, said measuring tape interengaging means extending outwardly of one end of said body member, the distance between the other end of said body member and the end of a measuring tape hookingly interengaged with said tape interengaging means being a whole member of inches.

2. A measuring tape and chalk line holding tool as defined in claim 1, wherein said measuring tape interengaging means comprises an outwardly extending length of bent metal terminating in an upwardly and inwardly directed portion.

3. A measuring tape and chalk line holding tool as defined in claim 2, wherein said chalk line interengaging means comprises a loop extending outwardly of said other end of said body member, and wherein said longitudinal groove, at said other end of said body member, merges into an arcuate recess provided in said other end of said body member for locating the end of a chalk line hookingly engaged in said loop.

* * * * *